United States Patent [19]

Strung

[11] Patent Number: 4,506,467
[45] Date of Patent: Mar. 26, 1985

[54] PORTABLE MIRROR BLIND

[76] Inventor: Norman Strung, Up Cottonwood Canyon, Bozeman, Mont. 59715

[21] Appl. No.: 493,830

[22] Filed: May 12, 1983

[51] Int. Cl.³ ............................................. A01M 31/02
[52] U.S. Cl. .......................................................... 43/1
[58] Field of Search .............................................. 43/1

[56] References Cited

U.S. PATENT DOCUMENTS

| | | | |
|---|---|---|---|
| 1,031,851 | 7/1912 | January | 43/1 |
| 2,827,729 | 3/1958 | Hoene | 43/1 |
| 2,992,503 | 7/1961 | Webb | 43/1 |
| 3,513,605 | 5/1970 | Smith | 43/1 |
| 3,540,170 | 11/1970 | Flowers | 43/1 |
| 3,848,352 | 11/1974 | Sayles | 43/1 |
| 3,936,969 | 2/1976 | Richard | 43/1 |
| 4,123,869 | 11/1978 | Witt | 43/1 |
| 4,164,089 | 8/1979 | George | 43/1 |

Primary Examiner—Gene P. Crosby
Attorney, Agent, or Firm—Leonard Bloom

[57] ABSTRACT

A portable hunting blind or the like formed from a plurality of panels interconnected and having an exterior surface provided with a mirror finish which reflects with total fidelity the aspects of the terrain immediately adjacent the blind. Channels are provided for assembling plural adjacent panels to form an enclosure, and the contour of the panels is such that optical distortion can be held to a minimum not only as the heighth of the panel increases, but along the transition area between adjacent panels. A plurality of optional tops are provided which can occlude the people within the blind from experiencing the weather from without, either partially or totally.

12 Claims, 6 Drawing Figures

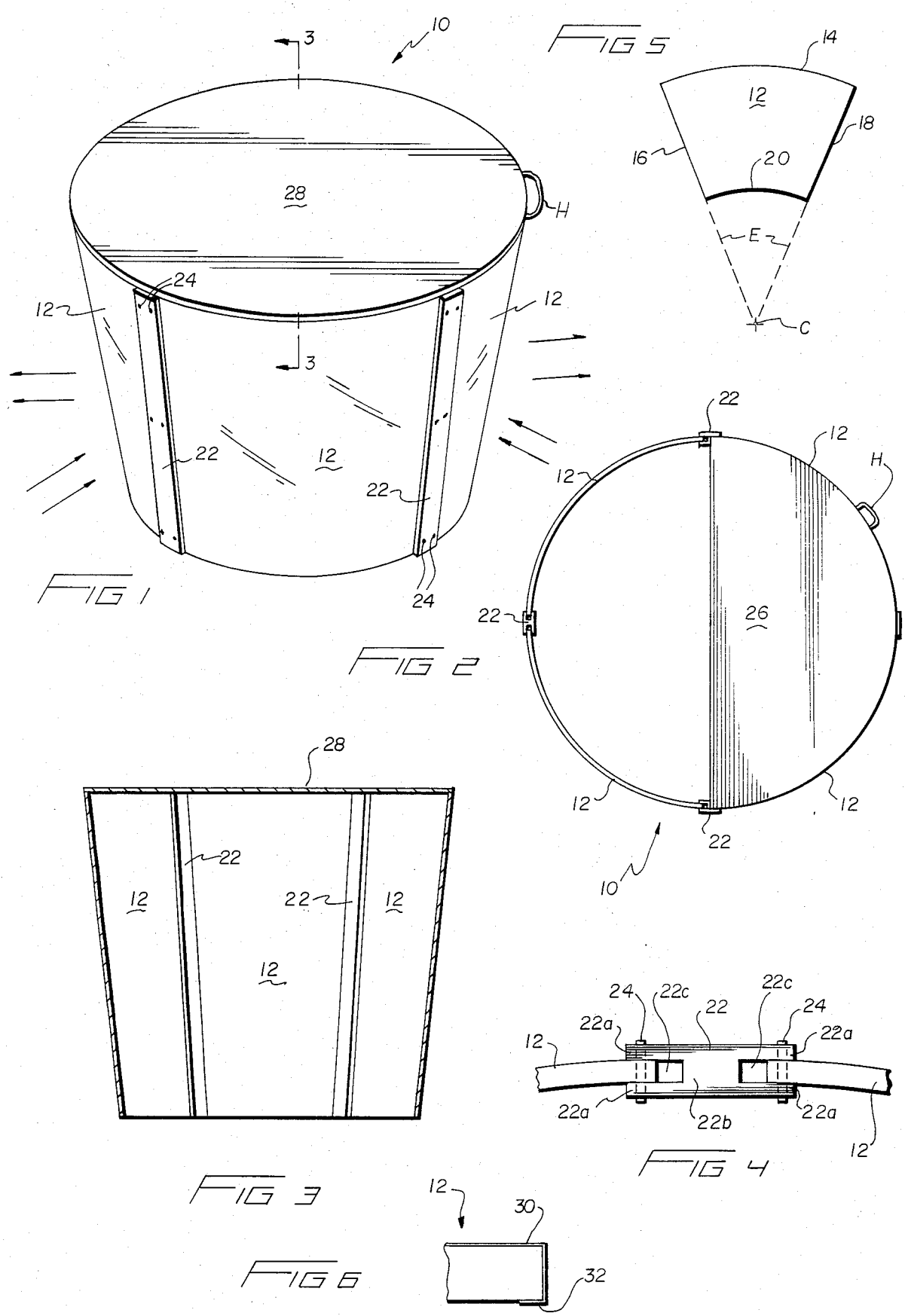

PORTABLE MIRROR BLIND

BACKGROUND OF THE INVENTION

The following relates generally to blinds used by hunters, photographers, and other outdoor enthusiasts to attain proximity to wildlife.

One of the most challenging endeavors in man's evolution has been the pursuit of game for the obvious benefits and reasons.

To this end, it is desirable to conceal oneself in such a pursuit so that animals that are highly sensitive to man's presence will not disturb their normal pattern of behavior. In this regard, in the past man has devised ingenious methods for concealing his presence, the one of interest and the one to which the instant invention pertains is hunting blinds or the like.

The following citations reflect the state-of-the-art of which applicant is aware insofar as these citations appear germane to the process at hand.

U.S. Pat. No. 2,827,729, Hoene
U.S. Pat. No. 2,992,503, Webb
U.S. Pat. No. 3,936,969, Richard
U.S. Pat. No. 4,123,869, Witt Each citation can be characterized as an attempt in the past to simulate a naturally occurring element in the wilderness. For example, the patent to Richard U.S. Pat. No. 3,936,969 provides a blind which is inflatable and has an outer surface which attempts to blend in with the environment.

The patent to Witt teaches the use of a hunting blind which is simulative of a plurality of hay bales.

The remaining citations show the state-of-the-art further.

The instant invention is distinguished over the known prior art by the provision of a new and improved hunting blind formed from a plurality of panels suitably fashioned so that when assembled an inverted truncated cone is provided, the outer walls of the blind suitably angled upwardly and outwardly and provided with a mirror finish by means of a plastic film or its equivalent such that the area of land immediately adjacent the wall panels forming the blind would be reflected by the mirror's surface. The plastic film may comprise a "MYLAR" film, "MYLAR" being a well-known registered trademark.

Clearly, most portable hunting/photography blinds are constrained by providing exterior camouflaging, with which once imprinted on the exterior panels of the blind do not lend themselves for ready removal for accommodation with an associated different terrain. For example, some blinds will be painted marsh-brown, jungle-green, snow-white, etc. and one who embarks upon a hunting trip may not necessarily know the specific site upon which the blind is to be established. In certain rugged terrain for example, snow may still exist on a northern most hill side, while a flat area leading to the hill will be substantially barren. Variegation of color of the associated foliage and habitat provide further problems in carefully camouflaging a blind, so that an experienced hunter or sportsman is required to either live with the blind that he currently has, or is forced to own a plurality of different blinds so as to select one that is suitable for the moment.

SUMMARY AND OBJECTS OF THE INVENTION

Accordingly, this invention has as its objective the provision of a new and novel portable blind having an external mirror finish so that terrain immediately adjacent the blind is reflected by the walls of the blind itself.

A further object of this invention is to provide a device as characterized above which is formed from a plurality of panels readily dissociated one from the other for ease in transporting.

A further object of this invention contemplates providing a device as characterized above in which the panels have an arcuate top surface and bottom surface and linear sides which when suitably deployed form a truncated conically shaped blind so that the optics associated with the mirror surface have improved qualities.

A further object of this invention contemplates providing a device as characterized above which is relatively inexpensive to manufacture, is safe to use, and lends itself to either mass production techniques or fabrication by the home enthusiast.

A further object of this invention contemplates providing a device as characterized above which is durable in construction and can be adapted to include a top panel thereby occluding a normally exposed portion of the blind for protection during inclement weather.

These and other objects will be made manifest when considering the following detailed specification when taken in conjunction with the appended drawing figures wherein there has been provided a mirrored blind having a truncated conical configuration when assembled, formed from a plurality of panels having arcuate top and bottom surfaces and linear side elements which when suitably interconnected form the truncated conical structure, the blind having an exterior provided with a mirrored finish so that area and terrain of variegated color immediately adjacent the blind will be reflected by the mirrored surfaces and therefore provide a blind which accurately reflects the terrain immediately proximate thereto, the geometrical configuration of the blind such that optical distortions are held to a minimum.

BRIEF DESCRIPTION OF THE DRAWING FIGURES

FIG. 1 is a perspective view of the portable mirror blind according to the present invention.

FIG. 2 is a top plan view with a modified form thereof.

FIG. 3 is a sectional view taken along lines 3—3 of FIG. 1.

FIG. 4 shows a detail directed to joining plural panels.

FIG. 5 depicts a single panel removed from the assembled blind illustrative of its associated geometry.

FIG. 6 provides detailing on the means for fastening the "MYLAR" film to the outer face of each panel.

BRIEF DESCRIPTION OF THE PREFERRED EMBODIMENT

Referring to the drawings now, wherein like reference numerals refer to like parts throughout the various drawing figures, reference numeral 10 is directed to the portable mirror blind according to the present invention.

As shown in the drawing figures, and in particular FIGS. 1 and 3, the blind 10 when assembled defines a truncated conical enclosure having an open bottom wall and a top capable of being opened or closed as is desired. FIGS. 1 and 2 disclose a blind 10 having a closed top 28 or a semi-circular top 26 respectively for total or partial occlusion of the top as is desired, for example during inclement weather or the like. It is contemplated that each top 28, 26 be formed from exterior type plywood ½" thick.

As shown in the drawing figures, the enclosure forming the blind is comprised of a plurality of panels 12, each panel 12 having the following configuration.

Each panel is coped to form a truncated sector of a circle having a constant radius outer arc 14 and two linear sides 16, 18 which if extended beyond the panel would meet at the center of curvature C, the linear sides 16, 18 when extended to the center defining radii for the outer arc. The truncation is defined by a constant radius inner arc 20 having the same center of curvature as the outer arc, the extension E of the linear sides 16, 18 themselves defining radii of the inner arc.

Each adjacent panel is connected one to the other by means of channels 22 of substantially H shaped configuration. More particularly, the channels can be formed from two pieces of 1'×4' wood stock joined together by a center piece 22b so that four legs 22a of the H shaped channel is provided. Alternatively, the channel 22 could be formed from a single piece of stock material by providing inwardly directed grooves 22c on opposed lateral edges of the stock material.

Adjacent panels 12 are then interconnected by the provision of holes that extend through each panel immediately adjacent the sides 16, 18 thereof and which are adapted to register with appropriate apertures provided in the channels 22. Upon registry, a suitable implement 24 such as a nail, pin, dowel, etc. is inserted through the registering hole and aperture to firmly affix adjacent panels together. In a preferred form of the invention, adjacent panels are layed out in a series, and all are fastened together except for two opposed extremities of the extended series of panels. Deformation of the panels is readily possible by bending so that the last two edges of the panel can be interconnected to thereby form the blind. For this purpose, the materials used for each panel 12 can take various forms, but it has been found that tempered "MASONITE" panels is especially suitable for this purpose, "MASONITE" being a well-known registered trademark.

The "MASONITE" panel 12 is provided with a mirror finish by affixing mirror type "MYLAR" film along an outer face of the panel by suitable adhesives or by appropriate taping. FIG. 6 depicts schematically a means by which the "MYLAR" film 30 is wrapped around an end portion of the panel 12 and affixed thereto by means of tape strips 32.

The camouflage effect has therefore been provided for the outer walls of the blind 10. It is important to note that the configuration of the panels and the resulting truncated conical structure tends to minimize the optical distortion which may occur by having strictly vertically oriented panels, since the resolution and optical purity of the topmost portion of a substantially vertical panel will have been compromised by its distance from the surface of the terrain which it reflects. Likewise, having an arcuate configuration of the panel allows the transition between adjacent panels to effect a relatively smooth contour, so that animals being observed are not as readily able to perceive optical distortions along edges of adjacent panels because of the smooth contour and transition from one panel to the next. Thus, the channels 22 which interconnect adjacent panels can suitably have a similar "MYLAR" film coating if desired to enhance the effect. The film fastening technique for the channel's exposed outer face would be similar to that for the panel.

For observing the migratory or in flight pattern of birds, the interior walls of the blind can be provided with a "reed" camoflauge if desired. The two different versions of the tops, the semi-circular top or the full top can be provided with no camouflaging adornment, or alternatively like the interior, a reed type camouflage. The appearance of the interior of the blind and the associated optional tops, however, are not of paramount importance, since animals and other objects to be surveyed when coming along the horizon would first encounter the outer periphery of the blind. For ease in operation of the two tops, removable hinges H may be provided along the interface between the tops periphery and an adjacent outer arc of one of the panels.

Thus, it may be seen that there has been provided a blind having an external periphery formed from a mirror surface adapted to reflect the variegated nuances of the immediately adjacent terrain with total fidelity and minimal optical distortion so that the presence of the blind is not readily discernable to animals being observed by occupants of the blind. Moreover, having thus described the invention, it should be apparent that numerous structural modifications are contemplated as being a part of this invention as set forth hereinabove and as defined hereinbelow by the claims.

I claim:

1. A portable blind simulative of the associated adjacent environment comprising in combination:
    an enclosure having a peripheral wall,
    and means on an outer surface of said wall to reflect accurately the immediately adjacent environment,
    wherein said reflective means comprises a mirrored surface,
    wherein said enclosure is formed from a plurality of panels provided with means to separate adjacent panels for storage,
    wherein said means to separate said panels comprises channel means running along side edges of adjacent panels interconnecting said panels, and
    wherein said interconnecting channel means for two adjacent panels is enhanced by means of pin shaped members adapted to traverse through each said panel and said channel.

2. The device of claim 1 wherein said panel is formed from a resilient material adapted to be deformed upon assemblage.

3. The device of claim 2 wherein said panels are coped to form a substantially truncated sector of a circle having a constant radius outer arc defining a top edge, and two linear sides defining edges which, if extended beyond said panel would meet at a center of curvature of said constant radius outer arc, said linear sides when extended to the center defining radii for said outer arc.

4. The device of claim 3 wherein said panel and its truncation is defined by a constant radius inner arc having the same said center of curvature as said outer arc, and extensions of said linear sides themselves define radii of the inner arc.

5. The device of claim 4 wherein said channels are of substantially H shaped configuration and include recesses on opposed lateral extremities thereof for reception therein of adjacent said panels.

6. The device of claim 5 wherein said enclosure is provided with a top covering.

7. The device of claim 6 wherein said covering is semi-circular in shape.

8. The device of claim 6 wherein said top is circular in shape and occludes the entire top portion, said top provided with hinge means for operative manipulation of said top.

9. The device of claim 10 wherein said mirrored reflecting means comprises a plastic film laminate adhesively bonded to an outer face of said panel.

10. A portable blind simulative of the associated adjacent environment comprising in combination, an inverted truncated conical structure having a peripheral wall provided with a camoflauged outer surface corresponding identically with the adjacent terrain's environment,
wherein said inverted truncated conical structure and its associated peripheral wall has an outer surface provided with a mirrored finish, and
wherein said inverted truncated conical structure is formed from a plurality of separable panels interconnected by channel means, said panels coped to form a truncated sector of a circle having a constant radius outer arc and two linear sides which if extended beyond the panel would meet at a center of curvature, said linear sides when extended to the center defining radii for the outer arc, said truncation is defined by a constant radius inner arc having the same center of curvature as said outer arc, said extensions of said linear sides themselves defining radii of the inner arc.

11. The device of claim 10 wherein said inverted truncated conical structure is provided with an enclosure top.

12. A portable blind, comprising an enclosure having an inverted truncated conical shape extending from a top portion thereof to substantially the ground level, the enclosure further having a mirrored outer surface to reflect the terrain immediately adjacent to the enclosure, the enclosure including at least one panel whose plan outline is in the form of a substantially truncated sector of a circle having a substantially constant-radius outer arc defining a curved top edge, and further having two linear sides which, when extended, intersect substantially at the center of curvature of the top curved edge and define respective radii therefor.

* * * * *